United States Patent
Zhang et al.

(10) Patent No.: US 11,977,537 B2
(45) Date of Patent: May 7, 2024

(54) METHOD AND DEVICE OF PROCESSING DATA FOR BLOCKCHAIN, AND BLOCKCHAIN SYSTEM

(71) Applicant: HEFEI DAPPWORKS TECHNOLOGY CO., LTD., Anhui (CN)

(72) Inventors: Yan Zhang, Anhui (CN); Yi Shi, Anhui (CN)

(73) Assignee: HEFEI DAPPWORKS TECHNOLOGY CO., LTD., Anhui (CN)

( * ) Notice: Subject to any disclaimer, the term of this patent is extended or adjusted under 35 U.S.C. 154(b) by 83 days.

(21) Appl. No.: 17/265,875

(22) PCT Filed: Dec. 28, 2018

(86) PCT No.: PCT/CN2018/124646
§ 371 (c)(1),
(2) Date: Feb. 4, 2021

(87) PCT Pub. No.: WO2020/133148
PCT Pub. Date: Jul. 2, 2020

(65) Prior Publication Data
US 2021/0200750 A1 Jul. 1, 2021

(51) Int. Cl.
*G06F 16/23* (2019.01)
*G06F 16/27* (2019.01)

(52) U.S. Cl.
CPC .......... *G06F 16/2379* (2019.01); *G06F 16/27* (2019.01)

(58) Field of Classification Search
None
See application file for complete search history.

(56) References Cited

U.S. PATENT DOCUMENTS 10,102,265 B1 * 10/2018 Madisetti ................ G06F 16/27
2017/0344435 A1 * 11/2017 Davis .................. G06F 16/9014
(Continued)

FOREIGN PATENT DOCUMENTS

CN  107508680  12/2017
CN  108600262  9/2018
(Continued)

OTHER PUBLICATIONS

International Search Report and Written Opinion issued in PCT/CN2018/124646, dated Sep. 27, 2019.

*Primary Examiner* — Kris E Mackes
*Assistant Examiner* — Cao D Vuong
(74) *Attorney, Agent, or Firm* — Pillsbury Winthrop Shaw Pittman, LLP (57) ABSTRACT

A method of processing data for a blockchain, wherein a blockchain network has a bottom blockchain network and an upper blockchain network, the bottom blockchain network has a plurality of bottom blockchain nodes, the upper blockchain network has a plurality of upper blockchain nodes, and the method is applied to the upper blockchain nodes, and the method includes: transmitting block data in a current node belonging to an upper blockchain of the upper blockchain network to a bottom blockchain node, so that each bottom blockchain node stores the block data into a bottom blockchain of the bottom blockchain network by using a consensus verification. The present disclosure also proposes a device of processing data for a blockchain, a blockchain system, a computer device and a computer readable medium.

15 Claims, 4 Drawing Sheets

(56) References Cited

U.S. PATENT DOCUMENTS

| | | | |
|---|---|---|---|
| 2018/0101560 A1* | 4/2018 | Christidis | H04L 9/3236 |
| 2018/0101701 A1* | 4/2018 | Barinov | H04L 9/3236 |
| 2018/0115428 A1* | 4/2018 | Lysenko | H04L 9/3247 |
| 2018/0165476 A1* | 6/2018 | Carey | H04L 9/3247 |
| 2019/0036710 A1 | 1/2019 | Qiu | |
| 2019/0102777 A1* | 4/2019 | Konik | H04L 9/3236 |
| 2020/0057565 A1* | 2/2020 | Sanghvi | G06F 3/0619 |
| 2020/0081999 A1* | 3/2020 | Mueller | H04L 63/0428 |
| 2021/0026740 A1* | 1/2021 | Guo | G06Q 20/065 |

FOREIGN PATENT DOCUMENTS

| | | |
|---|---|---|
| CN | 108629588 | 10/2018 |
| CN | 108665363 | 10/2018 |

\* cited by examiner

Fig. 7

METHOD AND DEVICE OF PROCESSING DATA FOR BLOCKCHAIN, AND BLOCKCHAIN SYSTEM

This application is the U.S. national phase entry of PCT Application No. PCT/CN2018/124646, filed on Dec. 28, 2018.

TECHNICAL FIELD

The present disclosure relates to a field of network technology, and more particularly, to a method and device of processing data for a blockchain and a blockchain system.

BACKGROUND

A blockchain is a distributed accounting technology. Because of the decentralization, immutability, and no need for third-party trust guarantees of the blockchain, it has gained wide attention.

There are various problems in the current mainstream blockchain network. The most prominent problem is the serious shortage of transaction throughput per second (tps). According to statistics, traditional payment methods processed an average of 1667 transactions per second in 2016, while Bitcoin may only process 3 to 4 transactions per second, and Ethereum may only process 20 transactions per second. In order to make the blockchain a truly usable transfer technology, it is urgent to expand the transaction throughput per second.

Moreover, in the initial stage of the establishment of the blockchain network, it is extremely easy to be tampered with by malicious nodes or attacked by hackers due to the scarcity of full nodes and the weakness of total computing power of the machines. This may lead to a lot of economic losses or even the collapse of the entire blockchain system.

SUMMARY

In view of this, the present disclosure provides a method and device of processing data for a blockchain and provides a blockchain system to at least partially solve the above problems.

One aspect of the present disclosure provides a method of processing data for a blockchain, wherein a blockchain network comprises a bottom blockchain network and at least one upper blockchain network, the bottom blockchain network comprises a plurality of bottom blockchain nodes, the upper blockchain network comprises a plurality of upper blockchain nodes, and the method is applied to the upper blockchain nodes, and the method comprising: transmitting block data in a current node belonging to an upper blockchain of an upper blockchain network to a bottom blockchain node, so that each bottom blockchain node stores the block data into a bottom blockchain of the bottom blockchain network by using a consensus verification.

Optionally, transmitting the block data in the current node belonging to the upper blockchain node of the upper blockchain network to the bottom blockchain node comprises: transmitting data for a new block to the bottom blockchain node, in response to the current node establishing the new block as a consensus node and adding the new block into the upper blockchain; or transmitting data for a block of preset number previous to a new block to the bottom blockchain node, in response to the current node establishing the new block as a consensus node and adding the new block into the upper blockchain.

Optionally, the method further comprises: for one block in the current node belonging to the upper blockchain of the upper blockchain network, obtaining block data for the one block from the bottom blockchain, and verifying legality of the one block based on the block data.

Optionally, the block data comprises a hash value of a block; and obtaining the block data for the one block storing in the bottom blockchain, wherein the verifying the legality of the one block based on the block data comprises: obtaining a hash value of the block storing in the bottom blockchain, determining that the block is illegal in response to the obtained hash value being different from a current hash value of the block, and determining that the block is legal in response to the obtained hash value being the same as the current hash value of the block.

Optionally, the method further comprises: performing data recovery on the block by using the block data for the block storing in the bottom blockchain, in response to determining that the block is illegal.

Optionally, the method further comprises: receiving vote data transmitted from an upper blockchain node with a first account balance and/or a second account balance in the upper blockchain network of the current node, the vote data comprises: information of an upper blockchain node in an upper blockchain network of a current node, wherein the upper blockchain node is selected by an upper blockchain node transmitting the vote data; and determining a consensus node from the upper blockchain node selected by each piece of vote data, based on vote data received in a current round, so that the consensus node performs a block packaging operation in a new round; wherein a value in a first account of any upper blockchain node is set to represent a number of digital currency of the upper blockchain network, and a value in a second account of any upper blockchain node is set to represent a number of votes of the upper blockchain network.

Optionally, the method further comprises: receiving transaction information transmitted from the upper blockchain node in the upper blockchain network of the current node; determining a first value according to the transaction information, wherein the first value represents a value added to a second account, wherein the second account belongs to an upper blockchain node as a transaction item provider of the transaction information; and transmitting the first value to each upper blockchain node in the upper blockchain network of the current node, so that each upper blockchain node stores the first value into an upper blockchain of each upper blockchain node.

Optionally, determining the first value according to the transaction information comprises: determining the first value according to a total amount of transaction items based on the transaction information.

Optionally, different upper blockchain networks correspond to different upper blockchains, and different upper blockchains store transaction information of different types of transaction items.

Another aspect of the present disclosure provides a device of processing data for a blockchain, wherein a blockchain network comprises a bottom blockchain network and at least one upper blockchain network, the bottom blockchain network comprises a plurality of bottom blockchain nodes, the upper blockchain network comprises a plurality of upper blockchain nodes, and the device is applied to the upper blockchain nodes, and the device comprising: a security processing module, set to transmit block data in a current node belonging to an upper blockchain of an upper blockchain network to a bottom blockchain node, so that each bottom blockchain node stores the block data into a bottom blockchain of the bottom blockchain network by using a consensus verification.

Optionally, the security processing module transmitting the block data in the current node belonging to the upper blockchain node of the upper blockchain network to the bottom blockchain node comprises: the security processing module, set to transmit data for a new block to the bottom blockchain node, in response to the current node establishing the new block as a consensus node and adding the new block into the upper blockchain; or transmit data for a block of preset number previous to a new block to the bottom blockchain node, in response to the current node establishing the new block as a consensus node and adding the new block into the upper blockchain.

Optionally, the device further comprises: a verification module, set to for one block in the current node belonging to the upper blockchain of the upper blockchain network, obtain block data for the one block from the bottom blockchain, and verify legality of the one block based on the block data.

Optionally, the block data comprises a hash value of a block; and the verification module obtaining the block data for the one block storing in the bottom blockchain, wherein the verifying the legality of the one block based on the block data comprises: the verification module, set to obtain a hash value of the block storing in the bottom blockchain, determine that the block is illegal in response to the obtained hash value being different from a current hash value of the block, and determine that the block is legal in response to the obtained hash value being the same as the current hash value of the block.

Optionally, the device further comprises: a recovery module, set to perform data recovery on the block by using the block data for the block storing in the bottom blockchain, in response to determining that the block is illegal.

Optionally, the device further comprises: a consensus module, set to receive vote data transmitted from an upper blockchain node with a first account balance and/or a second account balance in the upper blockchain network of the current node, the vote data comprises: information of an upper blockchain node in an upper blockchain network of a current node, wherein the upper blockchain node is selected by an upper blockchain node transmitting the vote data; and determine a consensus node from the upper blockchain node selected by each piece of vote data, based on vote data received in a current round, so that the consensus node performs a block packaging operation in a new round; wherein a value in a first account of any upper blockchain node is set to represent a number of digital currency of the upper blockchain network, and a value in a second account of any upper blockchain node is set to represent a number of votes of the upper blockchain network.

Optionally, the device further comprises: a vote issuing module, set to receive transaction information transmitted from the upper blockchain node in the upper blockchain network of the current node; determine a first value according to the transaction information, wherein the first value represents a value added to a second account, wherein the second account belongs to an upper blockchain node as a transaction item provider of the transaction information; and transmit the first value to each upper blockchain node in the upper blockchain network of the current node, so that each upper blockchain node stores the first value into an upper blockchain of each upper blockchain node.

Optionally, the vote issuing module determining the first value according to the transaction information comprises: the vote issuing module, set to determine the first value according to a total amount of transaction items based on the transaction information.

Optionally, different upper blockchain networks correspond to different upper blockchains, and different upper blockchains store transaction information of different types of transaction items.

Another aspect of the present disclosure provides a blockchain system, comprising: a bottom blockchain network and at least one upper blockchain network; the bottom blockchain network comprises a plurality of bottom blockchain nodes, and the upper blockchain network comprises a plurality of upper blockchain nodes; the upper blockchain node is set to transmit block data in a current node belonging to an upper blockchain of an upper blockchain network to a bottom blockchain node; and the bottom blockchain node is set to broadcast received block data to each bottom blockchain node, so that each bottom blockchain node stores the block data into a bottom blockchain of the bottom blockchain network by using a consensus verification.

Another aspect of the present disclosure provides a computer device, comprising a memory, a processor, and a computer program stored on the memory and running on the processor, the processor, when executing the program, implements the method as described above.

Another aspect of the present disclosure provides a computer readable medium, storing executable instructions thereon, wherein the instructions, when executed by a processor, cause the processor to execute the method as described above.

Another aspect of the present disclosure provides a computer program, comprising computer-executable instructions, the instructions are used to implement the method as described above when executed.

According to the embodiments of the present disclosure, it is possible to at least partially solve/mitigate/inhibit/even avoid the problems of low transaction throughput of blockchain networks and low security in the initial stage of establishment in the current technology, so that the legality of block data in the upper blockchain is double-verified by the upper blockchain network and the bottom blockchain network, and the security of the block data is double-protected by the upper blockchain and the bottom blockchain. The characteristics of multi-party witness and immutability of the blockchain can be further enhanced. And since a solution expands the existing one-dimensional blockchain network to a two-dimensional blockchain network by using the combination of the bottom blockchain network and the upper blockchain network, the transaction throughput of the entire blockchain network can be greatly improved and meet the needs of the current fast-developing transaction status for a blockchain networks.

BRIEF DESCRIPTION OF THE ACCOMPANYING DRAWINGS

The above and additional objectives, features and advantages of the present disclosure will become more obvious from the following description of the embodiments in conjunction with the accompanying drawings, in which.

DETAILED DESCRIPTION

Embodiments of the present disclosure will be described with reference to the drawings below. However, it should be understood that the description is only exemplary and not intended to limit the scope of the present disclosure. In the following detailed description, for ease of explanation, many specific details are set forth to propose a comprehensive understanding of the embodiments of the present disclosure. However, obviously, one or more embodiments may also be implemented without these specific details. In addition, in the following description, descriptions of well-known structures and technologies are omitted to avoid unnecessarily obscuring the concept of the present disclosure.

The terms used here are only for describing specific embodiments, and are not intended to limit the present disclosure. The terms "comprising", "including", etc. used herein indicate the existence of the described features, steps, operations and/or components, but do not exclude the presence or addition of one or more other features, steps, operations or components.

All terms used herein (including technical and scientific terms) have meanings commonly understood by those skilled in the art, unless otherwise defined. It should be noted that the terms used herein should be interpreted as having meanings consistent with the context of this description, and should not be explained in an idealized or overly rigid manner.

In the case of using an expression similar to "at least one of A, B, C, etc.", it should be generally interpreted according to the meaning of the expression commonly understood by those skilled in the art (for example, "a system with at least one of A, B and C" should comprise but is not limited to systems with A alone, B alone, C alone, A and B, A and C, B and C, and/or a system with A, B, C, etc.). In the case of using an expression similar to "at least one of A, B, or C, etc.", it should be generally interpreted according to the meaning of the expression commonly understood by those skilled in the art (for example, "a system with at least one of A, B or C" should comprise but is not limited to systems with A alone, B alone, C alone, A and B, A and C, B and C, and/or a system with A, B, C, etc.).

The embodiments of the present disclosure provide a method and device of processing data for a blockchain and provide a blockchain system capable of applying the method. The present disclosure establishes a new type of blockchain network, comprising a bottom blockchain network and at least one upper blockchain network, the bottom blockchain network comprises a plurality of bottom blockchain nodes, and the upper blockchain network comprises a plurality of upper blockchain nodes. The method comprises a phase of transmitting block data and a phase of reinforcing security, the phase of transmitting block data is performed by the upper blockchain nodes, block data in a current node belonging to an upper blockchain of an upper blockchain network is transmitted to a bottom blockchain node, and the phase of reinforcing security is performed by the bottom blockchain nodes, each bottom blockchain node stores the block data into a bottom blockchain of the bottom blockchain network by using a consensus verification after receiving the block data transmitted from the upper blockchain node.

Figure 1:
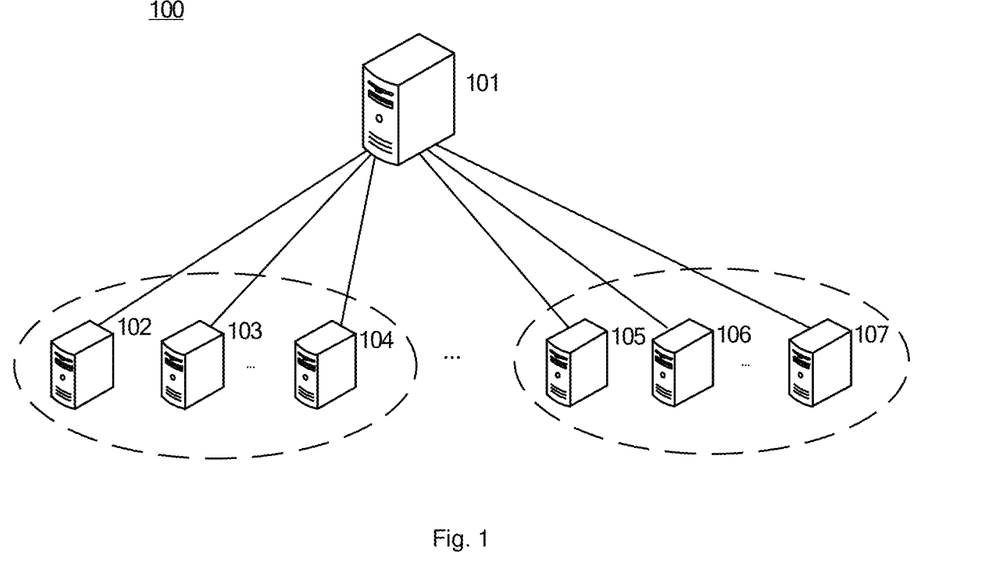
FIG. 1 shows a schematic system architecture of a method and a device of processing data which may be applied for a blockchain according to an embodiment of the present disclosure.

FIG. 1 shows a schematic system architecture of a method and a device of processing data which may be applied for a blockchain according to an embodiment of the present disclosure. It should be noted that FIG. 1 is only an example of a system architecture which may be applied for the embodiment of the present disclosure to help those skilled in the art understand the technical content of the present disclosure, but it does not mean that the embodiment of the present disclosure cannot be used for other devices, systems, environments or scenarios.

As shown in FIG. 1, the system architecture 100 according to the embodiment may comprise a plurality of electronic devices (101~107). The electronic devices (101~107) may be personal computers (PC), network servers, database servers, etc. Each of the electronic devices (101~107) may have the same or different computing capabilities.

As an implementation mode, a plurality of electronic devices may communicate with each other to establish a blockchain network. Each electronic device serves as a blockchain node in the blockchain network, and each blockchain node maintains the same blockchain database (hereinafter collectively referred to as "blockchain"). In addition, in the system architecture 100, each blockchain node may communicate with different service providers and/or client computing devices (such as server/server clusters, terminal devices, etc.), i.e., serves as a service provider and/or a blockchain node of the client, each service provider and/or client may perform operations such as reading and writing data in the blockchain via the corresponding blockchain node.

It should be understood that the number of electronic devices in FIG. 1 is only illustrative. There may be any number of electronic devices according to implementation needs.

The method of processing data for a blockchain provided by the embodiment of the present disclosure can be run in the electronic devices shown in FIG. 1.

Figure 2:
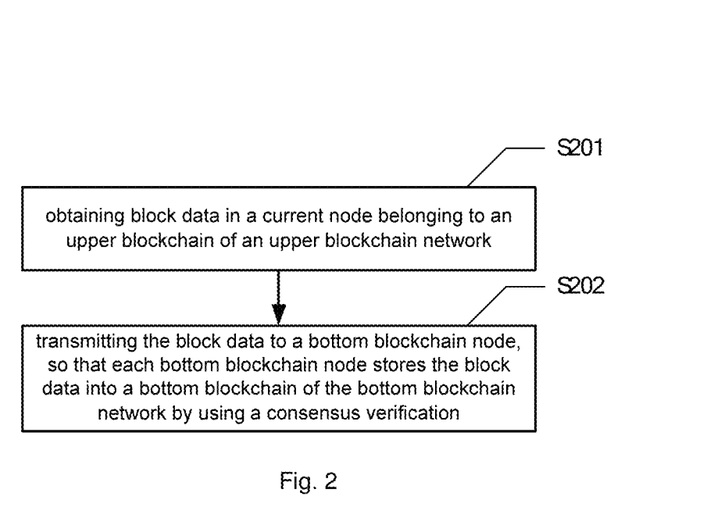
FIG. 2 shows a schematic flowchart of a method of processing data for a blockchain according to an embodiment of the present disclosure.

FIG. 2 shows a schematic flowchart of a method of processing data for a blockchain according to an embodiment of the present disclosure.

As shown in FIG. 2, the method is applied to a new type of blockchain network established by the present disclosure. The blockchain network comprises a bottom blockchain network and at least one upper blockchain network. The bottom blockchain network comprises a plurality of bottom blockchain nodes, and the upper blockchain network comprises a plurality of upper blockchain nodes. The method is performed by the upper blockchain nodes in the blockchain network, and the process of processing data for the blockchain provided by the present disclosure is explained from the side of the upper blockchain nodes.

The method comprises the following steps. At step S201, block data in a current node belonging to an upper blockchain of an upper blockchain network is obtained.

Then, at step S202, the block data is transmitted to a bottom blockchain node, so that each bottom blockchain node stores the block data into a bottom blockchain of the bottom blockchain network by using a consensus verification.

It can be seen that the method shown in FIG. 2 creatively establishes a composite double-layer blockchain network comprising the bottom blockchain network and at least one upper blockchain network. For any upper blockchain network, an upper blockchain node in the upper blockchain network may transmit block data in a blockchain of the upper blockchain network to the bottom blockchain network, and the bottom blockchain node may further store the block data in the upper blockchain into the bottom blockchain by using the consensus verification, so that the legality of block data in the upper blockchain is double-verified by the upper blockchain network and the bottom blockchain network, and the security of the block data is double-protected by the upper blockchain and the bottom blockchain. The characteristics of multi-party witness and immutability of the blockchain are further enhanced. And since the solution expands the existing one-dimensional blockchain network to a two-dimensional blockchain network by using the combination of the bottom blockchain network and the upper blockchain network, the transaction throughput of the entire blockchain network can be greatly improved and meet the needs of the current fast-developing transaction status for blockchain networks.

In an embodiment of the present disclosure, the method of transmitting the block data in the current node belonging to the upper blockchain node of the upper blockchain network to the bottom blockchain node shown in FIG. 2 may comprise: transmitting data for a new block to the bottom blockchain node, in response to the current node establishing the new block as a consensus node and adding the new block into the upper blockchain; or transmitting data for a block of preset number previous to a new block to the bottom blockchain node, in response to the current node establishing the new block as a consensus node and adding the new block into the upper blockchain.

According to the embodiment, for any upper blockchain network, in one situation, in response to an upper blockchain node as a consensus node establishing a new block and adding the block into an end of an upper blockchain of the upper blockchain network, relevant data for the new block is transmitted to the bottom blockchain network. That is, relevant data for the new block is synchronized to the bottom blockchain network in response to the upper blockchain establishing a latest block, so that each bottom blockchain node in the bottom blockchain network may store the relevant data for the latest block in the upper blockchain into the bottom blockchain by using a consensus verification, and the process is the same for each newly established block in the upper blockchain. In this way, each latest block generated in the upper blockchain may be synchronously verified by each bottom blockchain node in the bottom blockchain network. If the latest block has a problem, feedback of the bottom blockchain network may be obtained in time, and the upper blockchain network may avoid subsequent chaining of new blocks following the block with the problem.

In another situation, in response to an upper blockchain node as a consensus node establishing a new block and adding the block into an end of an upper blockchain of the upper blockchain network, relevant data for a block located at preset number previous to the new block in the upper blockchain may be transmitted to the bottom blockchain node. That is, relevant data for irreversible blocks having existed for a period of time in the upper blockchain is synchronized to the bottom blockchain network, so that each bottom blockchain node in the bottom blockchain network may store the relevant data for the latest block in the upper blockchain into the bottom blockchain by using a consensus verification, and the process is the same for each irreversible block in the upper blockchain. In this way, the upper blockchain network synchronizes irreversible blocks having existed for a period of time in the upper blockchain to the bottom blockchain, that is, directly synchronizes blocks with higher reliability to the bottom blockchain.

It can be known that no matter which method is used to synchronize the block data in the upper blockchain to the bottom blockchain, what is stored in the bottom blockchain is only legal and reliable block data in each upper blockchain, especially in the situation that the upper blockchain network is not complete and the number of the upper blockchain nodes is small, resulting in low legality and security of the blocks stored in the upper blockchain, the solution of storing the block data for the upper blockchain confirmed to be credible in the bottom blockchain, and helping the upper blockchain network to strengthen and backup the credible data as a legal basis for the blocks in the upper blockchain is helpful to maintain the stability of the upper blockchain network.

Therefore, in an embodiment of the present disclosure, the method shown in FIG. 2 further comprises: for one block in the current node belonging to the upper blockchain of the upper blockchain network, obtaining block data for the one block from the bottom blockchain, and verifying legality of the one block based on the block data.

Specifically, as an optional embodiment, the block data comprises a hash value of a block. Obtaining the block data for the one block storing in the bottom blockchain, wherein the verifying the legality of the one block based on the block data comprises: obtaining a hash value of the block storing in the bottom blockchain, determining that the block is illegal in response to the obtained hash value being different from a current hash value of the block, and determining that the block is legal in response to the obtained hash value being the same as the current hash value of the block.

The embodiment may deal with the situation where a block in the upper blockchain is maliciously attacked. For example, in response to a block A in the upper blockchain generated, all data comprised in the block A is legal, and block data for the block A is synchronized to the bottom blockchain network, and each bottom blockchain node stores the block data for the block A into a bottom blockchain of the bottom blockchain network by using a consensus verification. Due to the relatively complete development of the bottom blockchain network and a large number of nodes in the bottom blockchain, the block data for the block A in the upper blockchain stored in the bottom blockchain may not be tampered with under consensus supervision. Then when the block A in the upper blockchain may be tampered with, the block data for the block A stored in the bottom blockchain may be used as a legal basis, specifically, a first hash value of the block A stored in the bottom blockchain is obtained, a second hash value of the block A in the current upper blockchain is obtained, and in response to the second hash value being different from the first hash value, the block A in the upper blockchain is determined to be tampered with, in response to the second hash value being the same as the first hash value, the block A in the upper blockchain is determined not to be tampered with and is still legal.

Further, after using the block data for the upper blockchain stored in the bottom blockchain as the basis for determining the legality of the block in the upper blockchain, and determining whether the block in the upper blockchain is legal in the above embodiment, in an embodiment of the present disclosure, the method shown in FIG. 2 further comprises: performing data recovery on the block by using the block data for the block storing in the bottom blockchain, in response to determining that the block is illegal.

Following the example above, after determining that block A in the upper blockchain has been tampered with, the reliable block data for the block A stored in the bottom blockchain may be used to recover the tampered block A in the upper blockchain to recover the authenticity of the upper blockchain. In the situation that there are fewer nodes in the upper blockchain network and the upper blocks are prone to tampered and forged, in response to the upper blockchain unable to recover the correct data by a consensus mechanism of the upper blockchain, the embodiment may rely on the backup in the bottom blockchain to recover the data in the upper blockchain.

In an embodiment of the present disclosure, the upper blockchain network in the blockchain network provided by the present disclosure may adopt an improved consensus mechanism to determine a consensus node for each round. Specifically, the method shown in FIG. 2 further comprises: receiving vote data transmitted from an upper blockchain node with a first account balance and/or a second account balance in the upper blockchain network of the current node, the vote data comprises: for one upper blockchain network, information of an upper blockchain node in an upper blockchain network of a current node, wherein the upper blockchain node is selected by an upper blockchain node transmitting the vote data; and determining a consensus node from the upper blockchain node selected by each piece of vote data, based on vote data received in a current round, so that the consensus node performs a block packaging operation in a new round.

Wherein, a value in a first account of any upper blockchain node is set to represent a number of digital currency of the upper blockchain network, and a value in a second account of any upper blockchain node is set to represent a number of votes of the upper blockchain network. The upper blockchain node with the first account balance refers to the upper blockchain node holding digital currency, and the upper blockchain node with the second account balance refers to the upper blockchain node holding votes, then a source of the vote data received in the above operations may be: an upper blockchain node holding digital currency, an upper blockchain node holding votes, or an upper blockchain node holding both digital currency and votes. Wherein, digital currency is virtual currency exchanged in the upper blockchain network, and votes are virtual currency different from digital currency and issued to the upper blockchain nodes according to certain rules.

It can be seen that in the embodiment, for any upper blockchain network, the consensus node is determined by the vote data transmitted from each upper blockchain node. Specifically, the upper blockchain node transmitting the vote data is the upper blockchain node holding votes and/or digital currency, the vote data contains information of an upper blockchain node in a same blockchain network of a current node, wherein the upper blockchain node is selected by an upper blockchain node transmitting the vote data. The consensus node is determined from the upper blockchain nodes selected by each vote data in a round. Compared with a solution of determining a consensus blockchain node in the present technology, the scheme does not need to consume computing power resource of the upper blockchain nodes, and since the solution influences the vote authority of the upper blockchain node through voting and digital currency, the upper blockchain consensus can be effectively prevented from developing towards the centralizing trend of digital currency gathering in a few upper blockchain nodes, and maintain the characteristics of decentralization of the upper blockchain network.

In an embodiment of the present disclosure, votes can be issued to upper blockchain nodes in the upper blockchain network as needed by using different rules, so as to influence the consensus vote by the votes. Preferably, votes can be issued to upper blockchain nodes having contributions to the upper blockchain network, and voting rights for the consensus node can be issued to the upper blockchain nodes having contributions to the upper blockchain network to incentivize each blockchain node in the same upper blockchain network to jointly maintain the normal operation of the upper blockchain network.

Specifically, as an optional embodiment, the method shown in FIG. 2 further comprises: receiving transaction information transmitted from the upper blockchain node in the upper blockchain network of the current node; determining a first value according to the transaction information, wherein the first value represents a value added to a second account, wherein the second account belongs to an upper blockchain node as a transaction item provider of the transaction information; and transmitting the first value to each upper blockchain node in the upper blockchain network of the current node, so that each upper blockchain node stores the first value into an upper blockchain of each upper blockchain node.

The embodiment describes a solution for issuing votes to upper blockchain nodes in the upper blockchain network. The transaction information is information of events of transaction among the upper blockchain nodes. Under different circumstances, the upper blockchain node as the transaction item provider can be a full node or a light node, and the upper blockchain node as a transaction item purchaser can be a full node or a light node. A full node is a blockchain node that can perform block data structure packaging operations, perform data recording operations, and run smart contracts, while a light node cannot perform block data structure packaging operations, cannot perform data recording operations, and cannot run smart contracts, but either a full node or a light node may have a first account and a second account. The transaction information transmitted from the upper blockchain node comprises at least one of: information of the transaction item, information of the transaction item provider, and information of the purchaser of the transaction item. The votes of the first value are issued to the upper blockchain node as the transaction item provider. In response to issuing votes, identification information for the upper blockchain node as the transaction item provider may be broadcast to each upper blockchain node with the determined first value, so that each upper blockchain node with data recording capability stores the identification information for the upper blockchain node as the transaction item provider and the determined first value into a corresponding blockchain database, so that a relationship between the identification information for the upper blockchain node as the transaction item provider and the determined first value is uniformly recorded in the upper blockchain. That is, the information that represents the addition of the first value to the second account of the upper blockchain node as the transaction item provider is uniformly recorded and according to the above content, the information may also be synchronized to the bottom blockchain to ensure the supervisability and irreversibility of the vote issuing process.

Wherein, as an optional embodiment, determining the first value according to the transaction information comprises: determining the first value according to a total amount of transaction items based on the transaction information. That is, the contribution of the upper blockchain node as the transaction item provider to the upper blockchain network of the upper blockchain node as the transaction item provider is measured according to the total amount of the transaction items, and then a number of votes of the contribution is issued for the upper blockchain node as the transaction item provider.

It should be noted that the blockchain network provided by the embodiments of the present disclosure comprises a bottom blockchain network and at least one upper blockchain network. In response to there being a plurality of upper blockchain networks, different upper blockchain networks correspond to different upper blockchains, and different upper blockchains store transaction information of different types of transaction items. For example, a blockchain network comprises a bottom blockchain network and two upper blockchain networks. The first upper blockchain network is a blockchain network corresponding to a house rental platform, transaction information related to house rental is recorded in a blockchain of the blockchain network, and the transaction item is a house. The second blockchain network is a blockchain network corresponding to a network data flow sharing platform, and transaction information related to the network data flow is recorded in a blockchain of the blockchain network, and the transaction item is network data flow, etc. Different upper blockchain networks can be established according to needs to support different transaction processes, which can maximize the transaction throughput of the entire blockchain network.

The above embodiment illustrates the consensus mechanism adopted by the upper blockchain network. In an embodiment of the present disclosure, the consensus mechanism adopted by the bottom blockchain is a Proof of Work (POW) consensus mechanism, ensuring the credibility and security of the data stored in the bottom blockchain at a cost of the bottom blockchain nodes consuming much computing power, so as to provide effective data backup for each upper blockchain network.

The method shown in FIG. 2 will be further described with reference to FIG. 3A-FIG. 3B in combination with specific embodiments.

Figure 3A:
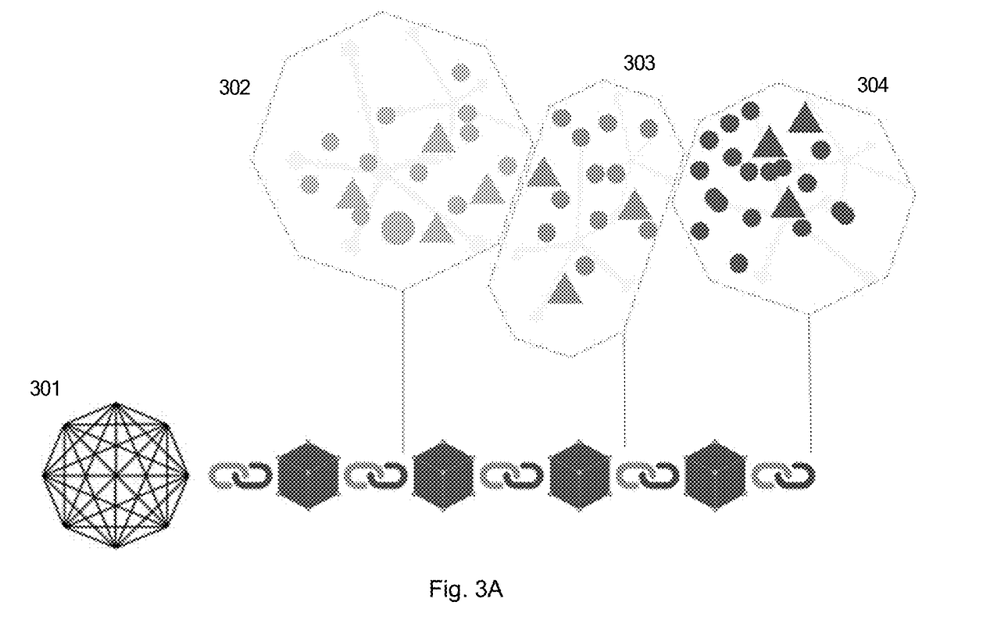
FIG. 3A shows a schematic architectural diagram of a blockchain network according to an embodiment of the present disclosure.

FIG. 3A shows a schematic architectural diagram of a blockchain network according to an embodiment of the present disclosure.

As shown in FIG. 3A, a blockchain network comprises a bottom blockchain network 301 and three upper blockchain networks 302, 303, and 304. The bottom blockchain network 301 corresponds to a bottom blockchain, and three upper blockchain networks 302, 303, and 304 respectively correspond to three different upper blockchains. The upper blockchain network 302 corresponds to an upper blockchain of a house rental platform, the upper blockchain network 303 corresponds to an upper blockchain of a network data flow sharing platform, and the upper blockchain network 304 corresponds to an upper blockchain of a computing power resource sharing platform. Each upper blockchain network comprises a plurality of upper blockchain nodes. Upper blockchain nodes of different shapes shown in the figure represent upper blockchain nodes with different functional permissions.

The bottom blockchain network uses the Proof of Work consensus mechanism. For any upper blockchain network, a new type of delegated proof of stake (D (POS+POX)) consensus mechanism based on the Delegated Proof of Stake (DPOS) consensus mechanism is adopted to reach a consensus. The D (POS+POX) consensus mechanism refers to not only allowing upper blockchain nodes with digital currency to perform consensus voting, but also allowing upper blockchain nodes with votes to perform consensus voting. The votes are issued to the upper blockchain nodes having contributions to the upper blockchain network according to certain rules. For example, for the upper blockchain network 302, upper blockchain nodes as providers of renting houses may be issued a number of votes according to the number of house rentals and the number of renting days. For the upper blockchain network 303, upper blockchain nodes as providers of network data flow may be issued a number of votes according to a total amount of shared network data traffic and time of shared network data traffic, etc. For the upper blockchain network 304, upper blockchain nodes as providers of computing power resource may be issued a number of votes according to a total amount of shared computing power resource and time of shared computing power resource, etc. Thus, each upper blockchain network has its own consensus mechanism, and each upper blockchain network operates in accordance with its own consensus mechanism.

For any upper blockchain network, a plurality of upper blockchain nodes establish the upper blockchain network, and the upper blockchain nodes may participate in the starting, performing, and ending of the transaction between the requester and the provider by using a smart contract. The upper blockchain nodes may issue votes by using the smart contract. The smart contract is usually pre-installed in the blockchain and can be triggered for execution. After meeting the trigger conditions, corresponding operations can be executed in the blockchain nodes. Since the smart contract stored in the blockchain is difficult to be tampered with, the smart contract can be used to execute the preset code logic without being interfered by any node during the execution process, and perform reliable and credible operations.

Figure 3B:
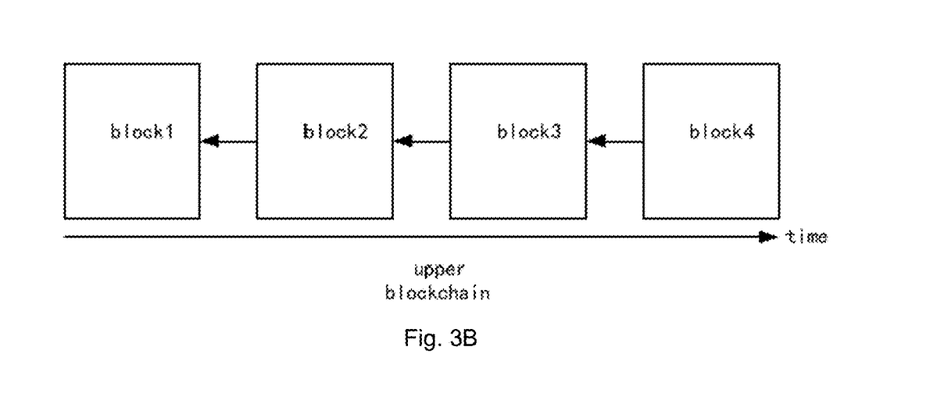
FIG. 3B shows a schematic diagram of an upper blockchain of an upper blockchain network according to an embodiment of the present disclosure.

FIG. 3B shows a schematic diagram of an upper blockchain of an upper blockchain network according to an embodiment of the present disclosure.

As shown in FIG. 3B, the upper blockchain may be a blockchain of any upper blockchain network in FIG. 3A. The upper blockchain of the upper blockchain network 302 is taken as an example for description. There are 4 block data structures in the blockchain currently.

In response to the upper blockchain network 302 determining a consensus node of a current round by using the D (POS+POX) consensus mechanism, the consensus node is packaged to establish a new block 5. After several consensus confirmations, in response to adding the block 5 into the upper blockchain shown in FIG. 3B, data for block 5 may be transmitted to the bottom blockchain network, each bottom blockchain node in the bottom blockchain network determines a consensus node in the bottom blockchain network by using the POW consensus mechanism, the consensus node packages the received data for the block 5 into a new block, and each bottom blockchain node adds the new block into the bottom blockchain by using a consensus verification. Or, after the upper blockchain network 302 determines a consensus node of a current round through the D (POS+ POX) consensus mechanism, the consensus node is packaged to establish a new block 5. After several consensus confirmations, in response to adding the block 5 into the upper blockchain shown in FIG. 3B, data for block 2 in an irreversible state previous to block 5 may be transmitted to the bottom blockchain network, each bottom blockchain node in the bottom blockchain network determines a consensus node in the bottom blockchain network by using the POW consensus mechanism, the consensus node packages the received data for the block 2 into a new block, and each bottom blockchain node adds the new block into the bottom blockchain by using a consensus verification.

Similarly, each block in the upper blockchain of the upper blockchain network 302 may be transmitted to the bottom blockchain network, and each block in the upper blockchain of other upper blockchain networks may be transmitted to the bottom blockchain network, and the bottom blockchain stores all legal data in the upper blockchain.

Furthermore, for any upper blockchain node in the upper blockchain network, by querying the bottom blockchain for a hash value of any block in the upper blockchain of the upper blockchain network, whether the block is legal may be verified. In this way, each block of the upper blockchain may become a relatively irreversible state. In response to a malicious node tampering with a block, or a hacker hacks into a block-making node and tampers with the block resulting in a fork, by comparing a hash value of the current upper blockchain with a hash value of the upper blockchain stored in the bottom blockchain, which of the multiple upper blockchain forks is a correct upper blockchain can be confirmed.

And, in response to the upper blockchain being damaged and cannot be recovered by its own consensus mechanism, the upper blockchain nodes in the corresponding upper blockchain network can still obtain all the block data in the upper blockchain by using the bottom blockchain, thereby recovering the entire upper blockchain.

Based on the above description, the beneficial effects of the present disclosure are as follows:

First, the present disclosure adopts the architecture of the bottom layer blockchain network and the upper blockchain network. Different upper blockchain networks correspond to different application scenarios, and the corresponding upper blockchain records data for different application scenarios. The architecture expands the one-dimensional blockchain to a two-dimensional blockchain and greatly increases the transaction throughput of the entire blockchain network.

Second, each application scenario uses an independent upper blockchain. The architecture isolates different application scenarios through different upper blockchains, so that each application scenario can be customized according to its own needs. The upper blockchain will not affect the performance of an upper blockchain in other application scenarios.

Third, the present disclosure uses the bottom blockchain to store all the block data for the upper blockchain, so that the data security of the newly added upper blockchain is greatly improved, which greatly reduces the risk that block data may be tampered with by malicious block creators or hackers in the initial stage of the newly added upper blockchain.

Figure 4:
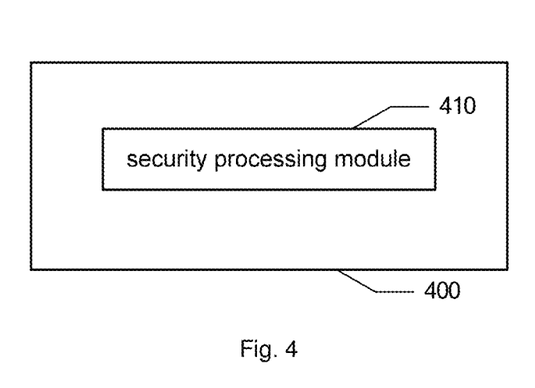
FIG. 4 shows a schematic block diagram of a device of processing data for a blockchain according to an embodiment of the present disclosure.

FIG. 4 shows a schematic block diagram of a device of processing data for a blockchain according to an embodiment of the present disclosure.

As shown in FIG. 4, the device of processing data for a blockchain 400 is applied to the new type of blockchain network established by the present disclosure, and the blockchain network comprises a bottom blockchain network and at least one upper blockchain network, the bottom blockchain network comprises a plurality of bottom blockchain nodes, and the upper blockchain network comprises a plurality of upper blockchain nodes. Specifically, the device of processing data for blockchain 400 is set in an upper blockchain node, and comprises a security processing module 410.

The security processing module 410 is set to transmit block data in a current node belonging to an upper blockchain of an upper blockchain network to a bottom blockchain node, so that each bottom blockchain node stores the block data into a bottom blockchain of the bottom blockchain network by using a consensus verification.

In an embodiment of the present disclosure, the security processing module 410 transmitting the block data in the current node belonging to the upper blockchain node of the upper blockchain network to the bottom blockchain node comprises: the security processing module 410, set to transmit data for a new block to the bottom blockchain node, in response to the current node establishing the new block as a consensus node and adding the new block into the upper blockchain; or transmit data for a block of preset number previous to a new block to the bottom blockchain node, in response to the current node establishing the new block as a consensus node and adding the new block into the upper blockchain.

In an embodiment of the present disclosure, different upper blockchain networks correspond to different upper blockchains, and different upper blockchains store transaction information of different types of transaction items.

Figure 5:
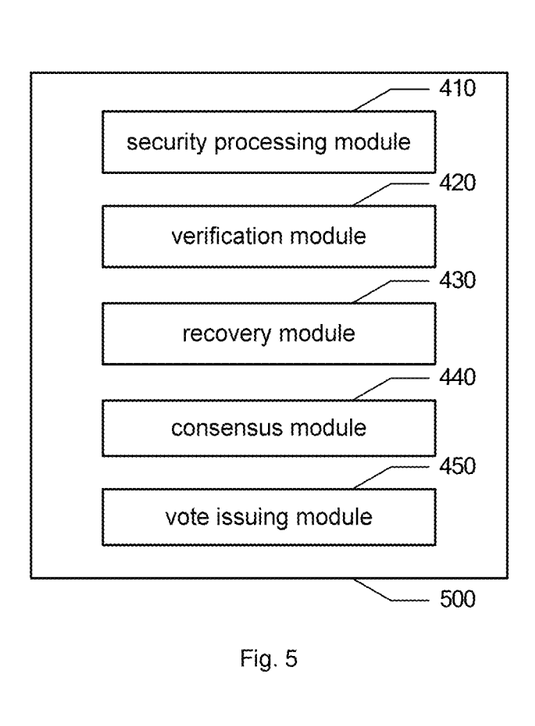
FIG. 5 shows a schematic block diagram of a device of processing data for a blockchain according to another embodiment of the present disclosure.

FIG. 5 shows a schematic block diagram of a device of processing data for a blockchain according to another embodiment of the present disclosure.

As shown in FIG. 5, the device of processing data for a blockchain 500 is applied to the upper blockchain node, comprising: a security processing module 410, a verification module 420, a recovery module 430, a consensus module 440, and a vote issuing module 450.

The security processing module 410 has been described above, and will not be repeated.

The verification module 420 is set to for one block in the current node belonging to the upper blockchain of the upper blockchain network, obtain block data for the one block from the bottom blockchain, and verify legality of the one block based on the block data.

Specifically, as an optional embodiment, the block data comprises a hash value of a block. The verification module 420 obtaining the block data for the one block storing in the bottom blockchain, wherein the verifying the legality of the one block based on the block data comprises: the verification module 420, set to obtain a hash value of the block storing in the bottom blockchain, determine that the block is illegal in response to the obtained hash value being different from a current hash value of the block, and determine that the block is legal in response to the obtained hash value being the same as the current hash value of the block.

In an embodiment of the present disclosure, the recovery module 430 is set to perform data recovery on the block by using the block data for the block storing in the bottom blockchain, in response to determining that the block is illegal.

In an embodiment of the present disclosure, the consensus module 440 is set to receive vote data transmitted from an upper blockchain node with a first account balance and/or a second account balance in the upper blockchain network of the current node, the vote data comprises: information of an upper blockchain node in an upper blockchain network of a current node, wherein the upper blockchain node is selected by an upper blockchain node transmitting the vote data; and determine a consensus node from the upper blockchain node selected by each piece of vote data, based on vote data received in a current round, so that the consensus node performs a block packaging operation in a new round.

Wherein, a value in a first account of any upper blockchain node is set to represent a number of digital currency of the upper blockchain network, and a value in a second account of any upper blockchain node is set to represent a number of votes of the upper blockchain network.

In an embodiment of the present disclosure, the vote issuing module 450 is set to set to receive transaction information transmitted from the upper blockchain node in the upper blockchain network of the current node; determine a first value according to the transaction information, wherein the first value represents a value added to a second account, wherein the second account belongs to an upper blockchain node as a transaction item provider of the transaction information; and transmit the first value to each upper blockchain node in the upper blockchain network of the current node, so that each upper blockchain node stores the first value into an upper blockchain of each upper blockchain node.

Wherein, as an optional embodiment, the vote issuing module 450 determining the first value according to the transaction information comprises: the vote issuing module 450, set to determine the first value according to a total amount of transaction items based on the transaction information.

Figure 6:
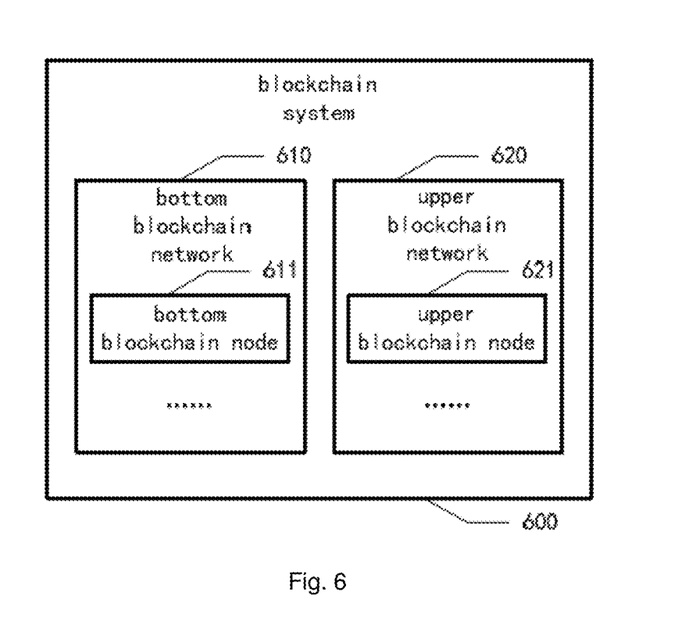
FIG. 6 shows a schematic block diagram of a blockchain system according to an embodiment of the present disclosure.

FIG. 6 shows a schematic block diagram of a blockchain system according to an embodiment of the present disclosure.

As shown in FIG. 6, the blockchain system 600 comprises: a bottom blockchain network 610 and at least one upper blockchain network 620.

The bottom blockchain network 610 comprises a plurality of bottom blockchain nodes 611, and the upper blockchain network 620 comprises a plurality of upper blockchain nodes 621.

The upper blockchain node 621 is set to transmit block data in a current node belonging to an upper blockchain of an upper blockchain network 620 to a bottom blockchain node 611.

The bottom blockchain node 611 is set to broadcast received block data to each bottom blockchain node 611, so that each bottom blockchain node 611 stores the block data into a bottom blockchain of the bottom blockchain network 610 by using a consensus verification.

It should be noted that the implementation of the modules/units/subunits, etc., the technical problems solved, the functions achieved, and the technical effects achieved in embodiments of the device are the same as or similar to the implementation of corresponding steps, the technical problems solved, the functions achieved, and the technical effects achieved, and will not be repeated here.

Functions of two or more of modules, sub-modules, units, and subunits according to the embodiments of the present disclosure, or at least a part thereof, may be implemented in one module. One or more of the modules, sub-modules, units, and sub-units according to the embodiments of the present disclosure may be split into multiple modules for implementation. One or more of the modules, sub-modules, units, and sub-units according to the embodiments of the present disclosure may be at least partially implemented as hardware circuits, such as field programmable gate array (FPGA), programmable logic array (PLA), system-on-chip, system-on-substrate, system-on-package, application specific integrated circuit (ASIC), or may be implemented by hardware or firmware in any other reasonable way that integrates or encapsulates the circuit, or by any one of the three implementation modes of software, hardware and firmware or in an appropriate combination of any of them. Alternatively, one or more of the modules, sub-modules, units, and sub-units according to the embodiments of the present disclosure may be at least partially implemented as a computer program module, and in response to the computer program module being run, may perform corresponding functions.

For example, any number of the security processing module 410, the verification module 420, the recovery module 430, the consensus module 440 and the vote issuing module 450 may be combined into one module for implementation, or one of the security processing module 410, the verification module 420, the recovery module 430, the consensus module 440 and the vote issuing module 450 may be split into multiple modules. Alternatively, at least part of the functions of the one or more modules may be combined with at least part of the functions of other modules and implemented in one module. According to an embodiment of the present disclosure, at least one of the security processing module 410, the verification module 420, the recovery module 430, the consensus module 440 and the vote issuing module 450 may be at least partially implemented as a hardware circuit, such as field programmable gate array (FPGA), programmable logic array (PLA), system-on-chip, system-on-substrate, system-on-package, application specific integrated circuit (ASIC), or may be implemented by hardware or firmware in any other reasonable way that integrates or encapsulates the circuit, or by any one of the three implementation modes of software, hardware and firmware or in an appropriate combination of any of them. Alternatively, at least one of the security processing module 410, the verification module 420, the recovery module 430, the consensus module 440 and the vote issuing module 450 may be at least partially implemented as a computer program module, and in response to the computer program module being run, it may perform corresponding functions.

Figure 7:
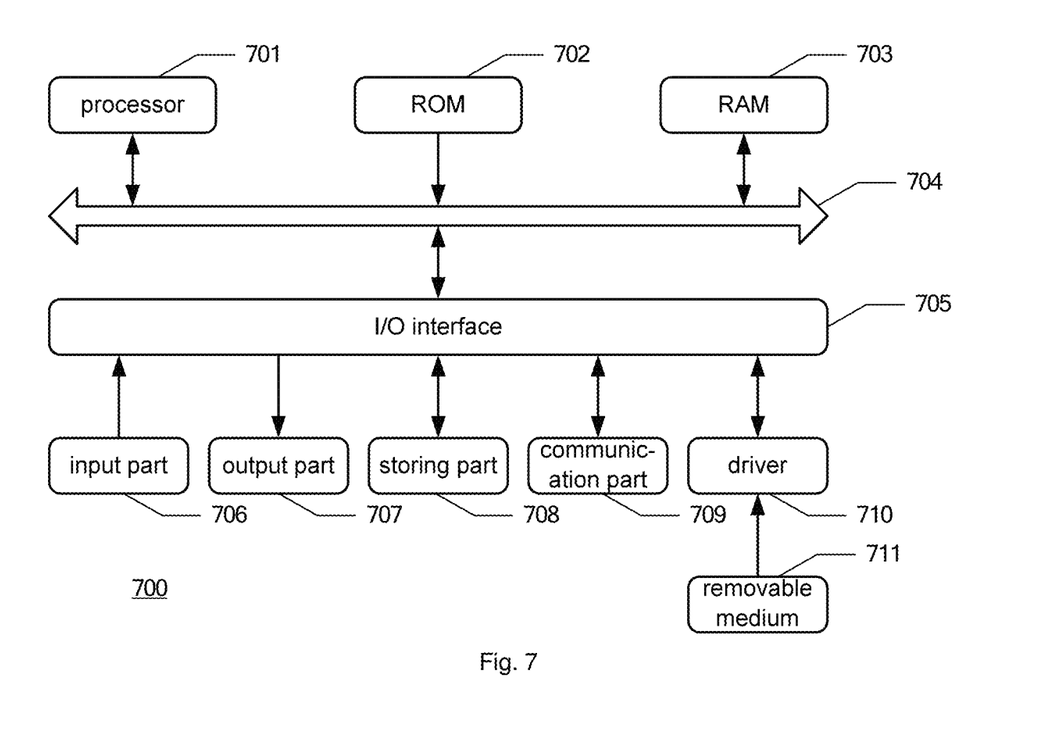
FIG. 7 shows a schematic block diagram of a computer device suitable for implementing a method of processing data for a blockchain according to an embodiment of the present disclosure.

FIG. 7 shows a schematic block diagram of a computer device suitable for implementing a method of processing data for a blockchain according to an embodiment of the present disclosure.

As shown in FIG. 7, a computer device 700 according to an embodiment of the present disclosure comprises a processor 701, wherein the processor 701 may execute various appropriate actions and processing according to a program stored in a read-only memory (ROM) 702 or a program loaded from a storing part 708 to a random access memory (RAM) 703. The processor 701 may comprise, for example, a general-purpose microprocessor (e.g., a CPU), an instruction set processor and/or a related chipset and/or a special-purpose microprocessor (e.g., an application specific integrated circuit (ASIC)), and so on. The processor 701 may also comprise on-board memory for caching purposes. The processor 701 may comprise a single processing unit for executing different actions of the method flow according to the embodiments of the present disclosure or multiple processing units.

In the RAM 703, various programs and data required for the operation of the device 700 are stored. The processor 701, the ROM 702, and the RAM 703 are connected to each other through a bus 704. The processor 701 executes various operations of the method flow according to the embodiments of the present disclosure by executing programs in the ROM 702 and/or RAM 703. It should be noted that the program may also be stored in one or more memories other than the ROM 702 and the RAM 703. The processor 701 may also execute various operations of the method flow according to the embodiment of the present disclosure by executing programs stored in the one or more memories.

According to an embodiment of the present disclosure, the device 700 may further comprise an input/output (I/O) interface 705, and the input/output (I/O) interface 705 is also connected to the bus 704. The device 700 may also comprise one or more of the following components connected to the I/O interface 705: an input part 706 comprising a keyboard, a mouse, etc.; an output part 707 comprising a cathode ray tube (CRT), a liquid crystal display (LCD), etc., and a speaker, etc.; a storing part 708 comprising a hard disk, etc.; and a communication part 709 comprising a network interface card such as a LAN card, a modem, etc. The communication part 709 performs communication processing via a network such as the Internet. The driver 710 is also connected to the I/O interface 705 as needed. A removable medium 711, such as a magnetic disk, an optical disk, a magneto-optical disk, a semiconductor memory, etc., is installed on the drive 710 as needed, so that the computer program read from the removable medium 711 is installed into the storing part 708 as needed.

According to the embodiments of the present disclosure, the method flow according to the embodiments of the present disclosure may be implemented as a computer software program. For example, an embodiment of the present disclosure comprises a computer program product, which comprises a computer program carried on a computer-readable medium, and the computer program comprises program code for executing the method shown in the flowchart. In such an embodiment, the computer program may be downloaded and installed from the network through the communication part 709, and/or installed from the removable medium 711. When the computer program is executed by the processor 701, the above functions defined in the system of the embodiments of the present disclosure are executed. According to the embodiments of the present disclosure, the systems, devices, apparatus, modules, units, etc. described above may be implemented by computer program modules.

The present disclosure also provides a computer-readable medium. The computer-readable medium may be comprised in the device/apparatus/system described in the above embodiments; or it may exist alone without being assembled into the device/apparatus/system. The above computer-readable medium carries one or more programs, and when the one or more programs are executed, it realizes: the blockchain consensus reaching method described in the above embodiments.

According to an embodiment of the present disclosure, the computer-readable medium may be a computer-readable signal medium or a computer-readable storage medium or any combination of the two. The computer-readable storage medium may be, for example, but not limited to, an electrical, magnetic, optical, electromagnetic, infrared, or semiconductor system, device, or apparatus, or any combination of the above. In the present disclosure, the computer-readable storage medium may be any tangible medium that comprises or stores a program, and the program may be used by or in combination with an instruction execution system, device, or apparatus. For example, according to an embodiment of the present disclosure, the computer-readable medium may comprise one or more memories other than the ROM 702 and/or RAM 703 and/or ROM 702 and RAM 703 described above.

The flowcharts and block diagrams in the accompanying drawings illustrate the possible architecture, functions, and operations of the system, method, and computer program product according to various embodiments of the present disclosure. In this regard, each block in the flowchart or block diagram may represent a module, program segment, or part of code, and the module, program segment, or part of code comprises one or more executable instructions for realizing the specified logical function. It should also be noted that, in some alternative implementations, the functions marked in the block may also occur in a different order from the order marked in the drawings. For example, two blocks shown in succession may actually be executed substantially in parallel, and they may sometimes be executed in the reverse order, depending on the functions involved. It should also be noted that each block in the block diagram or flowchart, and the combination of blocks in the block diagram or flowchart, may be implemented by a dedicated hardware-based system that performs the specified functions or operations, or may be realized by a combination of dedicated hardware and computer instructions. Those skilled in the art may understand that the features described in the various embodiments and/or the claims of the present disclosure may be combined and/or integrated in various ways, even if such combinations or integrations are not explicitly described in the present disclosure. In particular, without departing from the spirit and teaching of the present disclosure, the features described in the various embodiments and/or the claims of the present disclosure may be combined and/or integrated in various ways. All these combinations and/or integrations fall within the scope of the present disclosure.

The embodiments of the present disclosure have been described above. However, these embodiments are only for illustrative purposes, and are not intended to limit the scope of the present disclosure. Although the embodiments are described respectively above, it does not mean that the measures in the respective embodiments cannot be advantageously used in combination. The scope of the present disclosure is defined by the appended claims and their equivalents. Without departing from the scope of the present disclosure, those skilled in the art may make various substitutions and modifications, and these substitutions and modifications should fall within the scope of the present disclosure.

We claim:

1. A method of processing data for a blockchain, wherein a blockchain network comprises one bottom blockchain network and a plurality of at upper blockchain networks, the bottom blockchain network comprises a plurality of bottom blockchain nodes, each upper blockchain network comprises a plurality of upper blockchain nodes, and the method is applied to the upper blockchain nodes, the method comprising:

transmitting a new block data to a bottom blockchain node of the plurality of bottom blockchain nodes, in response to a current upper blockchain node belonging to an upper blockchain of an upper blockchain network establishing a new block as a consensus node and adding the new block into the upper blockchain, so that each bottom blockchain node stores the new block data into a bottom blockchain of the bottom blockchain network by using a consensus verification; and for a target block in an upper blockchain to which the current upper blockchain node belongs, obtaining a target block data for the target block from the bottom blockchain, and verifying legality of the target block by using the target block data; and performing data recovery on the target block by using target block data of the target block in the bottom blockchain, in response to determining that the target block in the upper blockchain is illegal, wherein the current upper blockchain node belonging to the upper blockchain of the upper blockchain network is determined as the consensus node using a delegated proof of stake type consensus mechanism, wherein the consensus mechanism allows both an upper blockchain node with digital currency and an upper blockchain node with a vote to perform consensus voting, and wherein the bottom blockchain network uses a Proof of Work consensus mechanism to perform the consensus verification on the transmitted new block data.

2. The method of claim 1, wherein:

the target block data comprises a hash value of a block; and obtaining the target block data for the target block storing in the bottom blockchain, wherein the verifying the legality of the target block by using the block data comprises:
  obtaining a hash value of the target block storing in the bottom blockchain,
  determining that the target block is illegal in response to the obtained hash value being different from a current hash value of the target block, and
  determining that the target block is legal in response to the obtained hash value being the same as the current hash value of the target block.

3. The method of claim 1, further comprising:

receiving vote data transmitted from an upper blockchain node of the plurality of upper blockchain nodes with a first account balance and/or a second account balance in the upper blockchain network of the current node, the vote data comprises: information of an upper blockchain node in an upper blockchain network of a current node, wherein the upper blockchain node is selected by an upper blockchain node transmitting the vote data; and determining a consensus node from the upper blockchain node selected by each piece of vote data, based on vote data received in a current round, so that the consensus node performs a block packaging operation in a new round, wherein a value in a first account of any upper blockchain node is set to represent a number of digital currency of the upper blockchain node, and a value in a second account of any upper blockchain node is set to represent a number of votes of the upper blockchain node.

4. The method of claim 3, further comprising:

receiving transaction information transmitted from the upper blockchain node in the upper blockchain network of the current node;

determining a first value according to the transaction information, wherein the first value represents a value added to a second account, wherein the second account belongs to an upper blockchain node as a transaction item provider of the transaction information; and transmitting the first value to each upper blockchain node in the upper blockchain network of the current node, so that each upper blockchain node stores the first value into an upper blockchain of each upper blockchain node.

5. The method of claim 4, wherein determining the first value according to the transaction information comprises determining the first value according to a total amount of transaction items based on the transaction information.

6. The method of claim 1, wherein different upper blockchain networks correspond to different upper blockchains, and different upper blockchains store transaction information of different types of transaction items.

7. A computer device, comprising a memory, a processor, and a computer program stored on the memory and running on the processor, the processor, when executing the program, implements the method of claim 1.

8. A non-transitory computer readable medium, storing executable instructions thereon or therein, wherein the instructions, when executed by a processor, cause the processor to execute the method of claim 1.

9. A non-transitory computer readable medium, storing executable instructions thereon or therein, wherein the instructions, when executed by a processor system, cause the processor system to at least:

for a blockchain network that comprises one bottom blockchain network comprising a plurality of bottom blockchain nodes and that comprises a plurality of at upper blockchain networks each comprising a plurality of upper blockchain nodes, transmit a new block data to a bottom blockchain node of the plurality of bottom blockchain nodes, in response to a current upper blockchain node of an upper blockchain network establishing a new block as a consensus node, so that each bottom blockchain node stores the new block data into a bottom blockchain of the bottom blockchain network by using a consensus verification;

for a target block in an upper blockchain to which the current upper blockchain node belongs, obtain a target block data for the target block from the bottom blockchain, and verify legality of the target block using the target block data; and perform data recovery on the target block by using target block data of the target block in the bottom blockchain, in response to determination that the target block in the upper blockchain is illegal, wherein the current upper blockchain node belonging to the upper blockchain of the upper blockchain network is determined as the consensus node using a delegated proof of stake type consensus mechanism, wherein the consensus mechanism allows both an upper blockchain node with digital currency and an upper blockchain node with a vote to perform consensus voting, and wherein the bottom blockchain network uses a Proof of Work consensus mechanism to perform the consensus verification on the transmitted new block data.

10. The medium of claim 9, wherein:

the target block data comprises a hash value of a block; and the instructions are further configured to cause the processor system to:

obtain the target block data for the target block storing in the bottom blockchain, and verify the legality of the target block using the block data by obtaining of a hash value of the target block storing in the bottom blockchain, determination that the target block is illegal in response to the obtained hash value being different from a current hash value of the target block, and determination that the target block is legal in response to the obtained hash value being the same as the current hash value of the target block.

11. The medium of claim 9, wherein the instructions are further configured to cause the processor system to:
   receive vote data transmitted from an upper blockchain node of the plurality of upper blockchain nodes with a first account balance and/or a second account balance in the upper blockchain network of the current node, the vote data comprises: information of an upper blockchain node in an upper blockchain network of a current node, wherein the upper blockchain node is selected by an upper blockchain node transmitting the vote data; and
   determine a consensus node from the upper blockchain node selected by each piece of vote data, based on vote data received in a current round, so that the consensus node performs a block packaging operation in a new round,
   wherein a value in a first account of any upper blockchain node is set to represent a number of digital currency of the upper blockchain node, and a value in a second account of any upper blockchain node is set to represent a number of votes of the upper blockchain node.

12. The medium of claim 11, wherein the instructions are further configured to cause the processor system to:
   receive transaction information transmitted from the upper blockchain node in the upper blockchain network of the current node;
   determine a first value according to the transaction information, wherein the first value represents a value added to a second account, wherein the second account belongs to an upper blockchain node as a transaction item provider of the transaction information; and
   transmit the first value to each upper blockchain node in the upper blockchain network of the current node, so that each upper blockchain node stores the first value into an upper blockchain of each upper blockchain node.

13. The medium of claim 12, wherein the instructions are further configured to cause the processor system to determine the first value according to a total amount of transaction items based on the transaction information.

14. The medium of claim 9, wherein different upper blockchain networks correspond to different upper blockchains, and different upper blockchains store transaction information of different types of transaction items.

15. A blockchain system, comprising:
   a bottom blockchain network comprising a plurality of bottom blockchain nodes;
   at least one upper blockchain network comprising a plurality of upper blockchain nodes; and
   the medium of claim 9.

* * * * *